(12) United States Patent
Wiegert

(10) Patent No.: US 6,865,455 B1
(45) Date of Patent: Mar. 8, 2005

(54) MAGNETIC ANOMALY GUIDANCE SYSTEM AND METHOD

(75) Inventor: Roy F. Wiegert, Panama City, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/373,493

(22) Filed: Feb. 19, 2003

(51) Int. Cl.[7] .......................... G05D 1/00; G01R 33/02
(52) U.S. Cl. ........................................ 701/23; 324/246
(58) Field of Search ............................... 701/1, 23, 24; 324/323, 331, 345, 200, 10.9, 220, 244, 246–247

(56) References Cited

U.S. PATENT DOCUMENTS

| | | | |
|---|---|---|---|
| 5,777,477 A | * | 7/1998 | Wynn .......................... 324/345 |
| 6,242,907 B1 | * | 6/2001 | Clymer et al. .......... 324/207.17 |
| 6,339,328 B1 | * | 1/2002 | Keene et al. ................ 324/248 |

OTHER PUBLICATIONS

Polvani, "Magnetic Guidance of Autonomous Vehicle Part 2", Jun. 1987, Unmanned Untethered Submersible Technology, Proceedings of the 1987 5th International Symposium on Jun. 1987, vol. 5, pp. 257–264.*

* cited by examiner

*Primary Examiner*—Thu V. Nguyen
(74) *Attorney, Agent, or Firm*—James T. Shepherd

(57) ABSTRACT

A system and method for magnetic anomaly guidance is provided. Triaxial magnetometer (TM) sensors are positioned at the vertices of an arrangement with an axis of the arrangement, being defined between each pair of the vertices. The arrangement is positioned on a support such that one of the X,Y,Z magnetic sensing axes for all of the sensors defines a forward direction of movement. The sensed magnetic field's X,Y,Z components of the TM sensors are processed to generate a partial gradient contraction associated with each axis of the sensor arrangement. Relationships between the partial gradient contractions are used to generate steering control commands for use by a steering system that is coupled to the support.

24 Claims, 3 Drawing Sheets

MAGNETIC ANOMALY GUIDANCE SYSTEM AND METHOD

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to guidance systems and methods, and more particularly to a magnetic anomaly guidance system and method that can be used to guide a movable and steerable platform toward a magnetic target.

BACKGROUND OF THE INVENTION

The use of autonomous mobile sensing platforms (i.e., robotic vehicles) is desirable in many applications because of hostile environments, inherently dangerous tasks and/or cost considerations. For example, the military's searching for land mines buried in the ground or under the seafloor is ideally carried out without the use of any personnel in the searching vicinity. In the commercial world, robotic vehicles can be used to locate and track buried cables and/or pipelines. In each of these uses, the "target" generally is made at least partially from a magnetically polarizable material.

U.S. Pat. No. 6,476,610 discloses a magnetic anomaly sensing system and method that derives target localization signals from mathematical scalar contractions of the magnetic gradient tensor (i.e., rate of change of the magnetic field relative to an X,Y,Z component distance between two sensing locations). The gradient contraction scalar methods for scalar-based triangulation and ranging use square and cubic arrays of triaxial magnetometers to effectively develop more than five gradient components at each point of the sensor system's space. While this approach provides a robust method of target localization, it may also be too complex for simple guidance. This approach's complexity highlights some shortcomings that can hinder its effectiveness if used as the basis for a magnetic guidance system. More specifically, if a vehicle must be guided to contact or near contact with the magnetic target, errors in target localization can result because the approach relies on i) the use of the far-field dipole approximation for the target's magnetic signature, ii) the assumption that the distance from the sensing vehicle to the target is much greater than the distance between sensing locations on the vehicle, and iii) solutions of inverse trigonometric functions which can cause errors for certain vehicle angles of approach to the target.

SUMMARY OF THE INVENTION

Accordingly, it is an object of the present invention to provide a magnetic anomaly guidance method and system.

Another object of the present invention is to provide a guidance method and system that can be used by autonomous vehicles to home in on and track sub-surface magnetic targets.

Other objects and advantages of the present invention will become more obvious hereinafter in the specification and drawings.

In accordance with the present invention, a system for (and method of) magnetic anomaly guidance is provided for use with a non-magnetic support having a steering system coupled thereto. The steering system is one that is responsive to steering control commands that can control the support's direction of movement when the support is moved on a surface. The magnetic anomaly guidance system has at least two triaxial magnetometer (TM) sensors coupled to the support for movement therewith. Each TM sensor has X,Y,Z magnetic sensing axes with corresponding ones of the X,Y,Z magnetic sensing axes being parallel to one another. Each TM sensor outputs X,Y,Z components ($B_x, B_y, B_z$) of local magnetic fields. Each TM sensor is positioned at one of the vertices of an arrangement thereof. An axis of the arrangement is defined between each pair of the vertices. The arrangement is positioned on the support such that one of the X,Y,Z magnetic sensing axes for all of the sensors defines a forward direction of movement of the support. The arrangement further has an axis of symmetry that is fixed with respect to the forward direction of movement. The X,Y,Z components ($B_x, B_y, B_z$) of the TM sensors are processed to generate a partial gradient contraction associated with each axis of the arrangement of sensors. As a result, a plurality of partial gradient contractions are generated. Relationships between the plurality of partial gradient contractions are used to generate the steering control commands for the steering system that is coupled to the support.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
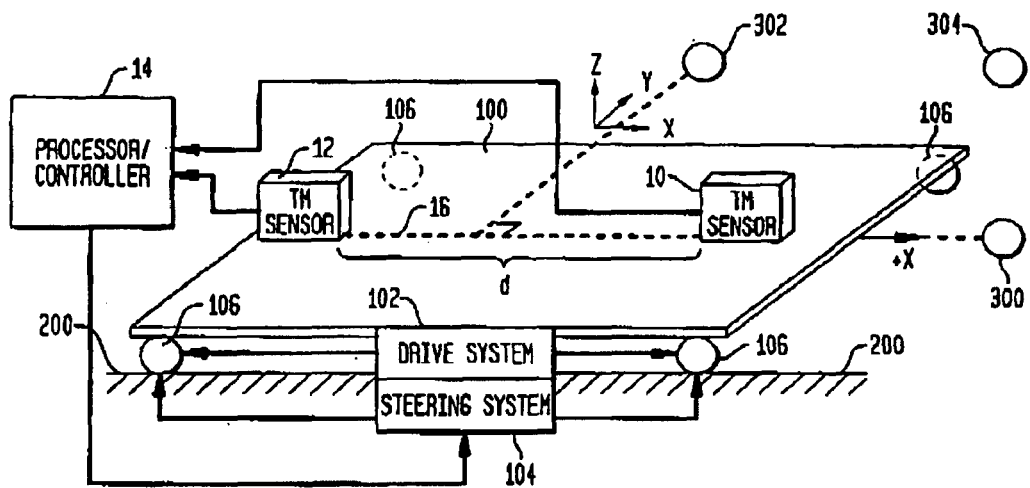
FIG. 1 is a schematic view of a single-axis gradiometer guidance system that can be used for magnetic anomaly guidance of a movable support platform/vehicle in accordance with the present invention.

Referring now to the drawings, and more particularly to FIG. 1, a single-axis gradiometer guidance system is shown mounted on a support platform 100 equipped with a drive system 102 and a steering system 104. Typically, drive system 102 and steering system 104 are coupled to wheels 106 to provide controlled movement of platform 100 on a surface 200 which can be man-made floor, a ground surface or a seafloor. Such drive and steering systems are well known in the art and are not limitations of the present invention. For purposes of the present invention, support platform 100 should be made of non-magnetic material.

The single-axis gradiometer guidance system consists of two triaxial magnetometer (TM) sensors 10 and 12 mounted on support platform 100 and coupled to a processor/controller 14 which, in turn, generates command signals used by steering system 104. Processor/controller 14 could also be used to command/control the output of drive system 102.

Each of TM sensors 10 and 12 is a triaxial magnetometer (TM) sensor. As is known in the art, a TM sensor has three mutually orthogonal magnetic field sensing axes for sensing magnetic field (i.e., B-field) components ($B_x, B_y, B_z$). The sense axis directions define a convenient and computationally efficient choice for a local (X,Y,Z) coordinate system.

The design and construction requirements that the B-field component sensing axes of the TM sensors used in the present invention must meet in order for this invention to provide a robust guidance system/method are as follows:

Provide a signal output that responds to the vector component of magnetic field along a single direction in space (i.e., the sensitive axis) and not respond to field components that are orthogonal to the sensitive axis.

Have a frequency response from DC to frequencies high enough to include the entire motion-induced frequency spectrum contained in a target's induction field.

Have sufficient sensitivity and dynamic range to effectively detect and discriminate small anomaly fields in the large background field of the earth.

Be of small physical size to allow a triad of sensors to be mutually configured in very close proximity as a triaxial array with orthogonal sense axes.

Present day vector magnetometer technology and recent advances in micro-electromechanical systems (MEMS) technology allows these criteria to be fulfilled by a variety of sense elements such as triaxial fluxgate magnetometers, giant magnetoresistive devices, superconducting quantum interference (SQUID) devices and enhanced sensitivity Hall effect devices.

In accordance with the present invention, each of TM sensors 10 and 12 is coupled to or mounted on platform 100 such that their X,Y,Z B-field sensing axes are parallel to one another and parallel to the overall X,Y,Z system's local coordinates reference frame. The system's X,Y,Z coordinate frame moves with platform 100. One of the system's X,Y,Z axes is chosen as the forward direction of movement of platform 100. By way of example, this will be the X-axis in each embodiment described herein so that the forward direction of movement will be in the +X direction. Accordingly, TM sensors 10 and 12 have their X-sensing axis aligned with the forward direction of movement of platform 100.

TM sensors 10 and 12 are arranged along a line or axis 16 and are spaced apart from one another along axis 16. More specifically, TM sensors 10 and 12 are separated by a distance d (i.e., d=$\Delta X$ in this case) while $\Delta Y = \Delta Z = 0$. Each of TM sensors 10 and 12 senses the X,Y,Z components of the magnetic B-field where ($B_{1X}, B_{1Y}, B_{1Z}$) are the components sensed by TM sensor 10 and ($B_{2X}, B_{2Y}, B_{2Z}$) are the components sensed by TM sensor 12. These B-field components are passed to processor/controller 14.

Processor/controller 14 processes the B-field components to generate a partial gradient contraction C associated with axis 16 where $$c = [(\Delta B_X/\Delta X)^2 + (\Delta B_Y/\Delta X)^2 + \Delta B_Z/\Delta X)^2 + \Delta B_Z/\Delta X)^2]^{0.5}$$

and where $\Delta B_X = (B_{2X} - B_{1X})$ $\Delta B_Y = (B_{2Y} - B_{1Y})$ $\Delta B_z = (B_{2Z} - B_{1Z})$ In general, this single-axis partial contraction C is dependent on sensor-to-target distance, sensor axis orientation and sensor axis length. More specifically, these dependencies can be explained as follows:

i) At a given point in the far field space of a given dipole target, the magnitude of the partial gradient contraction C (determined with respect to single axis 16) is proportional to the inverse fourth power of the distance between a target and the center of axis 16 although C varies more rapidly than the inverse fourth power of distance in the near field of the target; and ii) At any given point in space relative to a given target, the magnitude of c (determined with respect to single axis 16) is a monotonic function of the magnitude of the projection of the aXis's length ($\Delta X$ in this case) in the direction of the target. Mathematically, C is proportional to Kd+d(cosine $\theta$) where $\theta$ is the relative angle between the direction of axis 16 (i.e., the forward direction of movement of platform 100) and the position of the target, and K is a positive non-zero parameter included, to account for the fact that C does not go to zero when the axis is perpendicular to the target direction and (cosine $\theta$)=0.

Based on the above for a given distance to a target and a given target moment, partial gradient contraction C will be strongest when a (magnetic) target 300 is aligned with axis 16 (i.e., $\theta=0°$) and weakest when a target 302 is aligned on a line perpendicular to and passing through the center of axis 16 (i.e., $\theta=90°$). An intermediate value of C will result for a target 304 located such that $0<\theta<90°$.

If a single-axis gradiometer as just described were to be used in a magnetic guidance system, the C-values could be used in the following way. Platform 100 would move in a search pattern until the C-values increase from the background noise level to a level indicative of target detection. On detection of a target, processor/controller 14 would command steering system 104 (and, possibly, drive system 102) to rotate platform 100 to maximize the C-value. The maximum C-value at a given position of the sensor corresponds to the sensor axis alignment in the direction of the target. Platform 100 would then proceed in a direction that maintains a maximum C-value at each platform position until contact with the target is made.

The single-axis gradiometer-based guidance method is limited in that it requires substantial trial and error to find the initial alignment of the sensor axis with the target direction and to maintain that alignment as the sensor platform maneuvers toward the target. Thus, the single-axis configuration does not have the potential for robust guidance for typical two and three-dimensional search scenarios. More appropriate sensor configurations for robust two and three-dimensional magnetic guidance are presented herein where multi-axis arrays composed of single-axis-gradiometer-type axes are geometrically configured to take advantage of the symmetry properties of the gradient contraction in order to develop robust magnetic guidance parameters. Briefly, implementation of this concept involves the development of gradient contraction-based guidance signals from planar sets of at least two single-axis-gradiometer-type "primary guidance axes" and one or more "secondary guidance axes" that are symmetrically disposed about a geometric axis of symmetry. Examples of appropriate sensor configurations and magnetic guidance methods are discussed in the following paragraphs.

Figure 2:
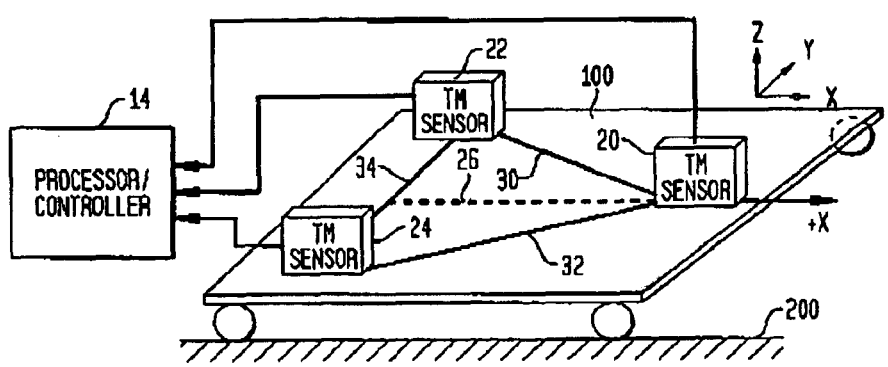
FIG. 2 is a schematic view of an embodiment of a three-axis gradiometer magnetic anomaly guidance system.

For example, FIG. 2 illustrates a three TM sensor version of the present invention. In this case, TM sensors 20, 22 and 24 are arranged/positioned at the vertices of a planar triangle that resides in the horizontal X-Y plane such that it is substantially parallel to surface 200 as platform 100 moves thereover. As in the previous embodiment, TM sensors 20, 22 and 24 are mounted on or otherwise coupled to platform 100 with their respective X,Y,Z sensing axes parallel to one another. The triangular arrangement defined by TM sensors 20, 22 and 24 can define an isosceles or equilateral triangle with TM sensor 20 residing at the forward position thereof with respect to the +X axis which defines the forward direction of movement. The triangular arrangement's axis of symmetry 26 (i.e., the axis that divides the triangle into two equal mirror-image triangles) is aligned with the X-axis of the X,Y,Z coordinate frame. Thus, axis of symmetry 26 is aligned with the forward direction of movement of platform 100. As a result, each of TM sensors 22 and 24 is equidistant from axis of symmetry 26 while TM sensor 20 lies on axis of symmetry 26.

The triangular arrangement of TM sensors 20, 22 and 24 defines three sensor pairs or "axes" of measurement with each such axis being defined between a pair of TM sensors. That is, a left primary axis 30 is defined between TM sensors 20 and 22, a right primary axis 32 is defined between TM sensors 20 and 24, and a bottom secondary axis 34 is defined between TM sensors 22 and 24. The length of axis 30 or $L_{30}$ is equal to that of axis 32 or $L_{32}$. The paired equal-length axes 30 and 32 are symmetrically disposed about axis of symmetry 26 in order to develop the primary guidance signals that are used to align axis 26 with the target direction. Secondary axis 34 is perpendicular to axis of symmetry 26 and develops an additional "secondary" guidance signal that can be combined with the primary signals from axes 30 and 32 to provide the invention with more robust magnetic guidance capabilities. The length of axis 34 or $L_{34}$ will not equal $L_{30}$ and $L_{32}$ in the case of an isosceles triangle, but will equal $L_{30}$ and $L_{32}$ in the case of an equilateral triangle.

In a magnetic anomaly guidance system, the X,Y,Z components of the B-fields sensed by TM sensors 20, 22 and 24 (i.e., respectively written as $(B_{1X}, B_{1Y}, B_{1Z})$, $(B_{2X}, B_{2Y}, B_{2Z})$ and $(B_{3X}, B_{3Y}, B_{3Z})$) are processed by processor/controller 14 to generate partial gradient contractions associated with each of axes 30, 32 and 34. Specifically, $$C_{30} = [(B_{2X}-B_{1X})^2 + (B_{2Y}-B_{1Y})^2 + (B_{2Z}-B_{1Z})^2]^{0.5}/L_{30}$$

$$C_{32} = [(B_{3X}-B_{1X})^2 + (B_{3Y}-B_{1Y})^2 + (B_{3Z}-B_{1Z})^2]^{0.5}/L_{32}$$

$$C_{34} = [(B_{3X}-B_{2X})^2 + (B_{3Y}-B_{2Y})^2 + (B_{3Z}-B_{2Z})^2]^{0.5}/L_{34}$$

In operation of such a guidance system, when platform 100 is headed straight at a target, axis of symmetry 26 will be pointed at the target so that $C_{30}=C_{32}$ while, for an equilateral planar array of TM sensors, $C_{34}<C_{30}=C_{32}$ since secondary axis 34 is both further from the target and perpendicular to the "target direction" (i.e., the direction that axis of symmetry 26 makes with the target). When platform 100 is not headed directly to the target, the relative magnitudes of $C_{30}$, $C_{32}$ and $C_{34}$ constitute guidance parameters used by processor/controller 14 to generate steering command signals for the steering system which has been omitted from FIGS. 2–6 for clarity of illustration. For simplicity of description, the following specific examples relate to equilateral sensor arrays in the form of equilateral triangles. However, it is to be understood that the present invention extends to isosceles triangles as noted above. Note that in general, the magnitude of $C_{34}$ relative to $C_{30}$ and $C_{32}$ will depend on a) the relative distances of the respective axes to the target, b) the orientations of the axes relative to the target direction and c) the relative lengths of the respective axes.

The guidance method can be implemented in the following fashion. Once a target has been detected, platform 100 is rotated about the Z-axis until the relationship $C_{30}=C_{32}>C_{34}$ is satisfied. This essentially aligns platform 100 so that axis of symmetry 26 is pointed at the target in the +X direction. Platform 100 is then moved in the +X direction while maintaining the relationship $C_{30}=C_{32}>C_{34}$. As platform 100 moves toward the target, the values of $C_{30}$, $C_{32}$ and $C_{34}$ increase as the platform-to-target distance decreases. Any time the relationship $C_{30}=C_{32}>C_{34}$ is not maintained, platform 100 is rotated until this relationship is again attained. For the sensor-platform configuration and forward direction shown in FIG. 2, the appropriate direction of rotation of platform 100 about the Z-axis is determined by the relative magnitudes of $C_{30}$ and $C_{32}$. For example, a small deviation of platform 100 to the left of the target direction causes axis 30 to become more closely aligned with the target direction than axis 32. Consequently, the relationship $C_{30}>C_{32}>C_{34}$ would develop and constitute a set of guidance parameter quantities that would indicate the direction and amount of rotation that platform 100 must be turned in order to align axis of symmetry 26 with the target direction. However, for large deviations of axis of symmetry 26 from the target direction and in the near-field regions close to the target, ambiguities can arise as to the relative position of the target with respect to axes 30 and 32 since the aforementioned length of axis dependence of gradient contraction C may dominate the orientation dependence factor and cause a reversal of the $C_{30}>C_{32}$ relationship. Also, note that in the near field region of target, ambiguities can arise as to the relative position of the target with respect to axes 30 and 32 since axis lengths become comparable to sensor-target distances.

Figure 3:
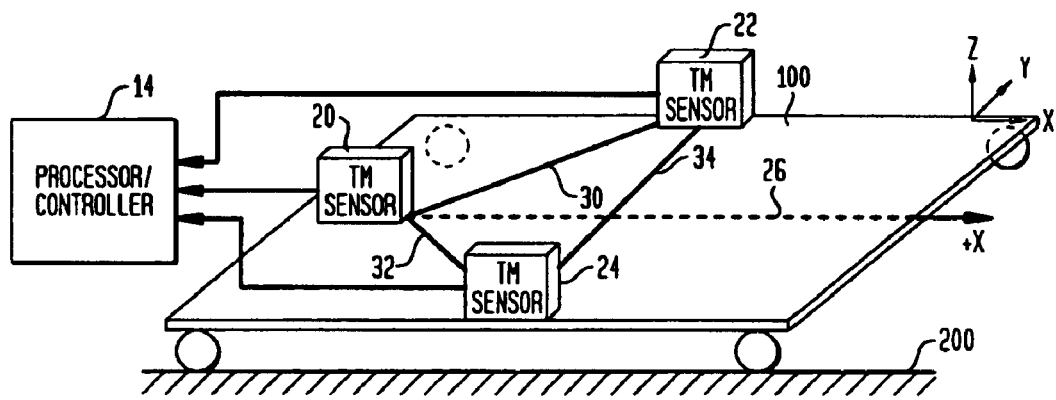
FIG. 3 is a schematic view of another embodiment of a three-axis gradiometer magnetic anomaly guidance system.

For the simple planar three TM sensor arrangement, some of the aforementioned ambiguities can be mitigated by using the configuration of FIG. 3 where TM sensors 22 and 24 now reside at the forward position with respect to the +X axis which defines the forward direction of movement of platform 100. As with the configuration in FIG. 2, platform 100 is rotated until $C_{30}=C_{32}$. Since the on-target-heading configuration of FIG. 3 has axis 34 closer to the target than axes 30 and 32, the on-target-heading condition (for an equilateral configuration) will be $C_{30}=C_{32}<C_{34}$.

In the FIG. 3 configuration, both very small and relatively very large deviations of axis of symmetry 26 away from the target direction cause the primary axis situated on the side of the symmetry axis 26 that is in the direction of symmetry deviation to become both further from the target and more poorly aligned with the target direction. Consequently, the gradient contraction value (or C-value) of the axis situated in the direction of platform rotation decreases relative to its "on-target" heading value. Conversely, the primary axis on the opposite side of axis of symmetry 26 relative to the direction of platform rotation is moved to be both closer to the target and in better alignment with the target direction so that its gradient contraction value (or C-value) increases relative to its "on-target" heading value. For example, both small and large deviations of platform 100 to the left (right) of the target direction will result will result in increases of both the distance factor and the orientation angle factor for the right axis 32 (left axis 30). Consequently, for example, the relationship $C_{32}>C_{30}$ would provide a robust indication that the platform 100 should be rotated toward the right in order to regain the on-target condition $C_{30}=C_{32}<C_{34}$. Again, as platform 100 moves toward the target in an on-target heading, the values of $C_{30}$, $C_{32}$ and $C_{34}$ increase.

Figure 4:
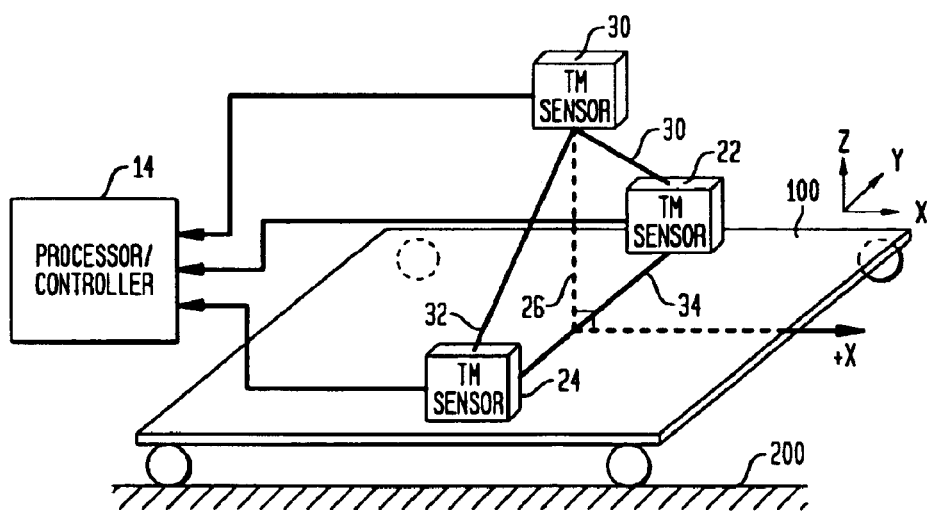
FIG. 4 is a schematic view of another embodiment of a three-axis gradiometer magnetic anomaly guidance system.

In using either of the FIG. 2 or 3 configurations, ambiguities may arise as to the relative position of targets that are located below the plane of sensor platform 100. Such would be the case if the targets were buried mines. Therefore, for applications that require a close approach or contact with a target at or under surface 200, a vertical triangular arrangement of TM sensors can be used as illustrated in FIG. 4. In this embodiment, the triangular arrangement defined by TM sensors 20, 22 and 24 lies in a plane perpendicular to the X-Y plane and is, therefore, perpendicular to surface 200. TM sensors 20, 22 and 24 are fixed so that the arrangement's axis of symmetry 26 is perpendicular to forward direction of movement along the +X direction. The partial gradient contractions $C_{30}$, $C_{32}$ and $C_{34}$ are determined as described above. When platform 100 is headed straight to a target in the X direction, $C_{30}=C_{32}$ while $C_{34}>C_{30}=C_{32}$ since axis 34 is closer to a target at or below surface 200 than axes 30 and 32 so that the magnetic gradient will be greater. When platform 100 is not heading directly for the target, the relative magnitudes of $C_{30}$, $C_{32}$ and $C_{34}$ will change in a manner that correlates with the direction and amount of platform deviation from the target direction.

The guidance method can be implemented in the following fashion. Once a target has been detected, platform 100 is rotated until $C_{30}=C_{32}$ to align the platform's forward direction of motion with the target. The appropriate direction of rotation of platform 100 about the Z-axis is determined by the relative magnitudes of $C_{30}$ and $C_{32}$. For example, if platform 100 deviates to the left of the target, the relationship $C_{30}<C_{32}$ develops. Conversely, if platform 100 deviates to the right of the target, the relationship $C_{30}>C_{32}$ develops.

Figure 5:
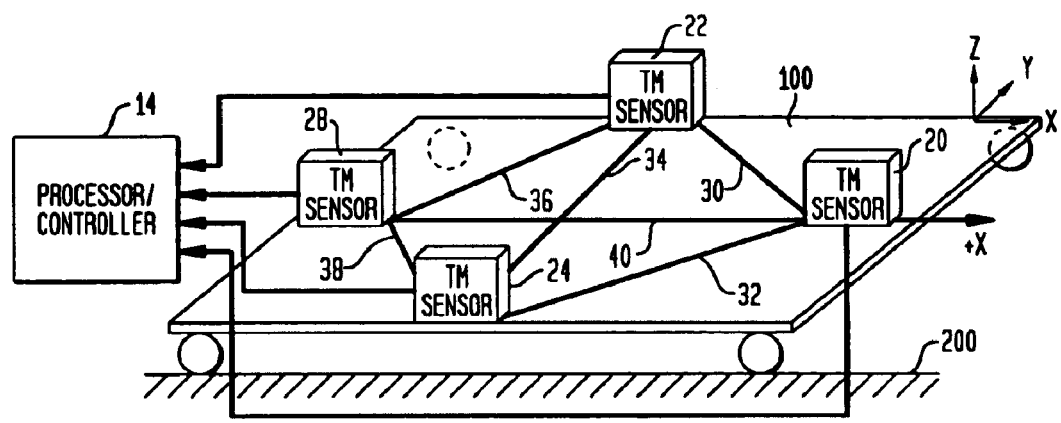
FIG. 5 is a schematic view of an embodiment of a six-axis gradiometer magnetic anomaly guidance system.
Figure 6:
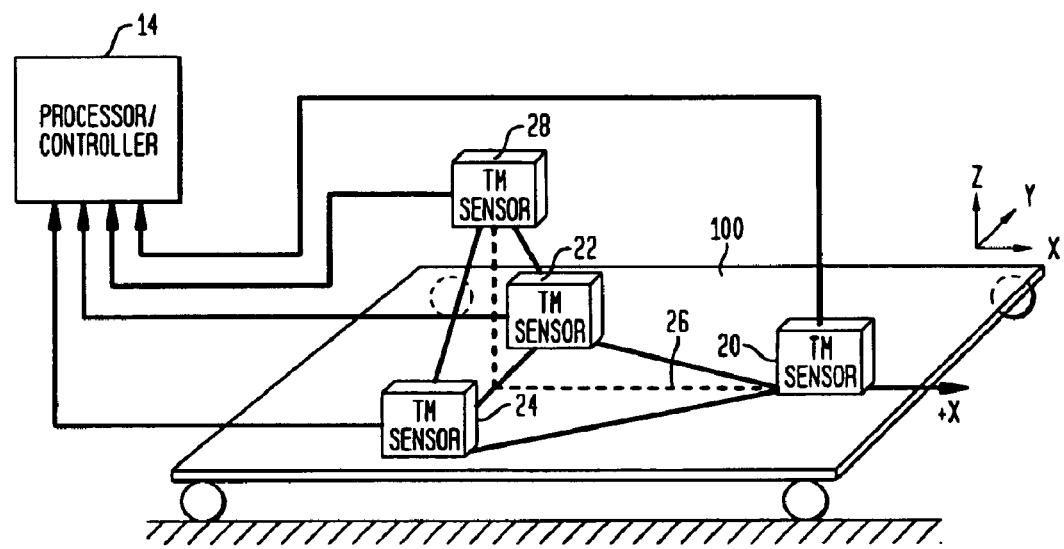
FIG. 6 is a schematic view of another embodiment of a six-axis gradiometer magnetic anomaly guidance system.

The robustness and versatility of the multi-axis array approach for magnetic guidance can be enhanced by increasing the number of axes presented by the array of sensors. Thus, the present invention is not limited to three-axis gradiometer guidance systems. For example, six-axis gradiometer guidance systems could also be created by the addition of a fourth TM sensor as illustrated in FIGS. 5 and 6. In FIG. 5, a six-axis planar gradiometer configuration is created by adding a fourth TM sensor 28 for the planar triangular arrangement shown in FIG. 2. That is, TM sensor 28 is located along axis of symmetry 26 at a point such that all four TM sensors lie in the same plane with perimeter axes 30, 32, 36 and 38 all being of equal length, i.e., $L_{30}=L_{32}=L_{36}=L_{38}$. Thus., the planar arrangement defined by TM sensors 20, 22, 24 and 28 defines a quadrilateral lying in a plane parallel to surface 200. The six axes defined by this arrangement are four primary axes 30, 32, 36 and 38 and two secondary axes 34 and 40 with axis 40 being coincident with axis of symmetry 26.

The partial gradient contractions $C_{30}$, $C_{32}$, $C_{34}$, $C_{36}$, $C_{38}$ and $C_{40}$ can be determined by the same process described for the three-axis gradiometer. The relationships between the C-values can be used by process/controller 14 to generate steering control commands for steering system 104. For example, when platform 100 is headed straight towards a target with axis of symmetry 26 aligned therewith, the following "alignment relationships" are true:

$C_{40}>C_{30},C_{32}$ $C_{30}=C_{32}>C_{36},C_{38}$ $C_{36}=C_{38}<C_{34}$

A rotation of platform 100 to the right (left) results in the target being located in the left (right) side of the system's detection space thereby causing relative reductions in $C_{30}$ and $C_{38}$ and relative increases in $C_{32}$ and $C_{36}$. Relative to the condition where axis 40 is aligned with a target, platform rotations in either direction will cause reductions in $C_{40}$ and increases in $C_{34}$.

It is to be understood that systems based on the use of four TM sensors are not limited to the quadrilateral arrangement depicted in FIG. 5. For example, four TM sensors could be arranged in a planar square or planar trapezoid. The square's side or trapezoid's base would be positioned perpendicular to the arrangement's axis of symmetry that would be aligned with the support platform's forward direction of movement and that would divide the arrangement into two mirror-image halves.

The FIG. 6 embodiment combines the features of the horizontal arrangement of FIG. 2 with the vertical arrangement of FIG. 4 to combine efficient magnetic guidance toward the target direction with localization capability for buried targets. Specifically, a horizontal planar arrangement of TM sensors is defined by TM sensors 20, 22 and 24 while a vertical planar arrangement of TM sensors is defined by TM sensors 22, 24 and 28. As in the previous triangular embodiments, TM sensors 22 and 24 are equidistant from axis of symmetry 26. Each of the triangular arrangements could define an isosceles or equilateral triangle.

The advantages of the present invention are numerous. The invention's symmetrical arrangements of triaxial magnetometer sensors, and methods of using relationships between gradient contraction values from symmetrically arranged axes of the sensor arrangements, provides a novel magnetic guidance system and method. The present invention will be useful as part of an autonomous vehicle controlled system that uses a detected magnetic anomaly to steer itself. The magnetic anomaly can originate from a point target or from continuous track such as a buried cable, pipeline or specifically-placed guidance track.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A magnetic anomaly guidance system for use on a non-magnetic support having a steering system coupled thereto that is responsive to steering control commands used to control said support's direction of movement when said support is moved on a surface, said magnetic anomaly guidance system comprising:

at least two triaxial magnetometer (TM) sensors coupled to said support for movement therewith, each of said TM sensors having X,Y,Z magnetic sensing axes with corresponding ones of said X,Y,Z magnetic sensing axes being parallel to one another, wherein each of said TM sensors outputs X,Y,Z components ($B_x$,$B_y$,$B_z$) of local magnetic fields;

each of said TM sensors being positioned at vertices of an arrangement of said TM sensors, wherein an axis of said arrangement is defined between each pair of said vertices;

said arrangement being positioned on said support such that one of said X,Y,Z magnetic sensing axes for each of said TM sensors defines a forward direction of movement of said support;

said arrangement having an axis of symmetry that is fixed with respect to said forward direction of movement; and means, coupled to said TM sensors and to said steering system of said support, for processing said X,Y,Z components ($B_x, B_y, B_z$) of said TM sensors to generate a partial gradient contraction associated with each said axis wherein a plurality of partial gradient contractions are generated, said means using relationships between said plurality of partial gradient contractions to generate said steering control commands for use by said steering system.

2. A magnetic anomaly guidance system as in claim 1 wherein said arrangement is in the shape of a triangle lying in a plane parallel to said surface with said axis of symmetry aligned with said forward direction of movement, and with i) a first of said vertices on said axis of symmetry, and ii) a second and third of said vertices lying equidistant from said axis of symmetry.

3. A magnetic anomaly guidance system as in claim 2 wherein said triangle is selected from the group consisting of isosceles triangles and equilateral triangles.

4. A magnetic anomaly guidance system as in claim 2 wherein said first of said vertices is forward of said second and third of said vertices with respect to said forward direction of movement.

5. A magnetic anomaly guidance system as in claim 2 wherein said first of said vertices is aft of said second and third of said vertices with respect to said forward direction of movement.

6. A magnetic anomaly guidance system as in claim 1 wherein said arrangement is in the shape of a triangle lying in a plane perpendicular to said surface with said axis of symmetry perpendicular to said forward direction of movement, and with i) a first of said vertices on said axis of symmetry, and ii) a second and third of said vertices lying equidistant from said axis of symmetry.

7. A magnetic anomaly guidance system as in claim 6 wherein said triangle is selected from the group consisting of isosceles triangles and equilateral triangles.

8. A magnetic anomaly guidance system as in claim 6 wherein said first of said vertices is above said second and third of said vertices.

9. A magnetic anomaly guidance system as in claim 1 wherein said arrangement is in the shape of a quadrilateral lying in a plane parallel to said surface with two of said vertices on said axis of symmetry.

10. A magnetic anomaly guidance system as in claim 1 wherein said arrangement comprises:
  a first sub-arrangement defined by three of said TM sensors, said first sub-arrangement defining a first triangle lying in a plane parallel to said surface with said axis of symmetry aligned with said forward direction of movement, said first triangle having a first vertex on said axis of symmetry and having second and third vertices disposed on either side of and equidistant from said axis of symmetry; and
  a second sub-arrangement defined by three of said TM sensors, said second sub-arrangement defining a second triangle lying in a plane perpendicular to said surface, said second triangle having a first vertex aligned with said axis of symmetry and having second and third vertices disposed on either side of and equidistant from said axis of symmetry,
  wherein said second and third vertices of said first triangle are coincident with said second and third vertices, respectively, of said second triangle.

11. A magnetic anomaly guidance system as in claim 10 wherein each of said first triangle and said second triangle is selected from the group consisting of isosceles triangles and equilateral triangles.

12. A magnetic anomaly guidance system as in claim 10 wherein said first vertex of said first triangle is forward of i) said first vertex of said second triangle, and ii) said second and third vertices of said first triangle and said second triangle, with respect to said forward direction of movement.

13. A magnetic anomaly guidance method, comprising the steps of:
  providing a non-magnetic support having a steering system coupled thereto that is responsive to steering control commands used to control said support's direction of movement when said support is moved on a surface;
  providing at least two triaxial magnetometer (TM) sensors coupled to said support for movement therewith, each of said TM sensors having X,Y,Z magnetic sensing axes, wherein each of said TM sensors outputs X,Y,Z components ($B_x, B_y, B_z$) of local magnetic fields;
  positioning said TM sensors such that corresponding ones of said X,Y,Z magnetic sensing axes are parallel to one another;
  positioning each of said TM sensors at vertices of an arrangement of said TM sensors, wherein an axis of said arrangement is defined between each pair of said vertices, and wherein said arrangement has an axis of symmetry;
  positioning each of said TM sensors such that one of said X,Y,Z magnetic sensing axes for each of said TM sensors defines a forward direction of movement of said support;
  fixing said axis of symmetry with respect to said forward direction of movement;
  processing said X,Y,Z components ($B_x, B_y, B_z$) of said TM sensors to generate a partial gradient contraction associated with each said axis wherein a plurality of partial gradient contractions are generated; and
  generating said steering control commands using relationships between said plurality of partial gradient contractions.

14. A method according to claim 13 wherein said step of positioning said TM sensors at said vertices includes the step of forming said arrangement in the shape of a triangle lying in a plane parallel to said surface with said axis of symmetry aligned with said forward direction of movement, and with i) a first of said vertices on said axis of symmetry, and ii) a second and third of said vertices lying equidistant from said axis of symmetry.

15. A method according to claim 14 wherein said triangle is selected from the group consisting of isosceles triangles and equilateral triangles.

16. A method according to claim 14 wherein said first of said vertices is forward of said second and third of said vertices with respect to said forward direction of movement.

17. A method according to claim 14 wherein said first of said vertices is aft of said second and third of said vertices with respect to said forward direction of movement.

18. A method according to claim 13 wherein said step of positioning said TM sensors at said vertices includes the step of forming said arrangement in the shape of a triangle lying in a plane perpendicular to said surface with said axis of symmetry perpendicular to said forward direction of movement, and with i) a first of said vertices on said axis of symmetry, and ii) a second and third of said vertices lying equidistant from said axis of symmetry.

19. A method according to claim 18 wherein said triangle is selected from the group consisting of isosceles triangles and equilateral triangles.

20. A method according to claim 18 wherein said first of said vertices is above said second and third of said vertices.

21. A method according to claim 13 wherein said step of positioning said TM sensors at said vertices includes the step of forming said arrangement in the shape of a quadrilateral lying in a plane parallel to said surface with two of said vertices on said axis of symmetry.

22. A method according to claim 13 wherein said step of positioning said TM sensors at said vertices includes the steps of:
- forming a first sub-arrangement of said arrangement that is defined by three of said TM sensors, said first sub-arrangement defining a first triangle lying in a plane parallel to said surface with said axis of symmetry aligned with said forward direction of movement, said first triangle having a first vertex on said axis of symmetry and having second and third vertices disposed on either side of and equidistant from said axis of symmetry;
- a second sub-arrangement of said arrangement that is defined by three of said TM sensors, said second sub-arrangement defining a second triangle lying in a plane perpendicular to said surface, said second triangle having a first vertex aligned with said axis of symmetry and having second and third vertices disposed on either side of and equidistant from said axis of symmetry; and
- positioning said first sub-arrangement and said second sub-arrangement such that said second and third vertices of said first triangle are coincident with said second and third vertices, respectively, of said second triangle.

23. A method according to claim 22 wherein each of said first triangle and said second triangle is selected from the group consisting of isosceles triangles and equilateral triangles.

24. A method according to claim 22 wherein steps of forming includes the step of positioning said first vertex of said first triangle forward of i) said first vertex of said second triangle, and ii) said second and third vertices of said first triangle and said second triangle, with respect to said forward direction of movement.

* * * * *